US012756109B2

(12) United States Patent
Chien et al.

(10) Patent No.: US 12,756,109 B2
(45) Date of Patent: Oct. 6, 2026

(54) MULTIPLE POLARIZED DISH ANTENNA

(71) Applicant: Gemtek Technology Co., Ltd., Hsinchu (TW)

(72) Inventors: Hsiao-Ching Chien, Hsinchu (TW); Hsu-Sheng Wu, Hsinchu (TW); Yi Chang Tu, Hsinchu (TW)

(73) Assignee: Gemtek Technology Co., Ltd., Hsinchu (TW)

(*) Notice: Subject to any disclaimer, the term of this patent is extended or adjusted under 35 U.S.C. 154(b) by 396 days.

(21) Appl. No.: 18/479,116

(22) Filed: Oct. 2, 2023

(65) Prior Publication Data

US 2024/0222878 A1 Jul. 4, 2024

Related U.S. Application Data

(60) Provisional application No. 63/435,809, filed on Dec. 29, 2022.

(51) Int. Cl.

| | |
|---|---|
| ***H01Q 15/16*** | (2006.01) |
| ***H01Q 1/38*** | (2006.01) |
| ***H01Q 15/24*** | (2006.01) |

(52) U.S. Cl.

CPC ............... *H01Q 15/16* (2013.01); *H01Q 1/38* (2013.01); *H01Q 15/24* (2013.01)

(58) Field of Classification Search

CPC .......... H01Q 15/16; H01Q 1/38; H01Q 15/24; H01Q 15/20; H01Q 19/10; H01Q 19/12–18; H01Q 1/28

See application file for complete search history.

(56) References Cited

U.S. PATENT DOCUMENTS 3,276,022 A * 9/1966 Brunner ................. H01Q 19/19 343/781 R
4,434,425 A * 2/1984 Barbano ................ H01Q 19/17 343/797

(Continued)

FOREIGN PATENT DOCUMENTS

| | | | | |
|---|---|---|---|---|
| CN | 103531895 A * | 1/2014 | | |
| EP | 1082782 B1 * | 7/2003 | ............. | H01Q 1/246 |
| EP | 4386419 A1 * | 6/2024 | ........... | H01Q 3/2629 |
| WO | 2020173298 A1 † | 9/2020 | | |

OTHER PUBLICATIONS

Liu et al. "A Mutual Coupling Suppressed Dual-Band Dual-Polarized Base Station Antenna Using Multiple Folded-Dipole Antenna" Sep. 30, 2022, IEEE.†

(Continued)

*Primary Examiner* — Hasan Islam
(74) *Attorney, Agent, or Firm* — JCIPRNET

(57) ABSTRACT

A multiple polarized dish antenna includes a main dish reflector and a multiple polarized antenna source. The main dish reflector includes an inner concave surface. The multiple polarized antenna source is at least partially disposed beside the inner concave surface. The inner concave surface of the main dish reflector reflects a radiation energy emitted by the multiple polarized antenna source. The multiple polarized antenna source includes a carrier, at least one radiator, and feeding portions. The carrier includes a conductive layer. The at least one radiator is disposed above the carrier. A resonance gap is between the at least one radiator and the conductive layer. The feeding portions are disposed beside the at least one radiator. A projection of each of the feeding portions on a plane where the corresponding radiator is located is at least partially overlapped with the radiator. each of the feeding portions is insulated from the conductive layer.

12 Claims, 8 Drawing Sheets

(56) References Cited

U.S. PATENT DOCUMENTS

| | | | | | |
|---|---|---|---|---|---|
| 5,216,433 | A * | 6/1993 | Kurtz | H01Q 13/025 | 333/137 |
| 8,803,757 | B2 † | 8/2014 | Shen | | |
| 9,270,013 | B2 † | 2/2016 | Ley | | |
| 9,966,648 | B2 * | 5/2018 | Liu | H01Q 1/125 | |
| 10,468,770 | B2 † | 11/2019 | Puente Baliarda | | |
| 10,749,266 | B2 † | 8/2020 | Mizzoni | | |
| 11,581,661 | B2 † | 2/2023 | Seo | | |
| 11,888,229 | B1 * | 1/2024 | Dressel | H01Q 13/0241 | |
| 2013/0092154 | A1 * | 4/2013 | Lu | F24S 30/425 | 126/685 |
| 2015/0280329 | A1 * | 10/2015 | Sanford | H01Q 13/02 | 343/837 |
| 2017/0125919 | A1 * | 5/2017 | Chien | H01Q 9/0414 | |

OTHER PUBLICATIONS

Lin et al. "High Isolation DualPolarized Patch Antenna with Hybrid", 2017, International Journal of Antennas and Propagation.†

Li et al. "Equivalent-Circuit Analysis of a Broadband Printed Dipole With Adjusted Integrated Balun and an Array for Base Station Applications", Jul. 2009, IEEE Transactions on Antennas and Propagation, vol. 57, No. 7.†

Zhu et al. "Ultra-Wideband Dual-Polarized Patch Antenna With F Four Capacitively Coupled Feeds", May 2014, IEEE Transactions on Antennas and Propagation.†

* cited by examiner
† cited by third party

MULTIPLE POLARIZED DISH ANTENNA

CROSS-REFERENCE TO RELATED APPLICATION

This application claims the priority benefit of U.S. provisional application Ser. No. 63/435,809, filed on Dec. 29, 2022. The entirety of the above-mentioned patent application is hereby incorporated by reference herein and made a part of this specification.

BACKGROUND

Technical Field

The disclosure relates to a dish antenna, and more particularly, to a multiple polarized dish antenna.

Description of Related Art

At present, a common dish antenna is mainly formed by a single polarized antenna or a dual polarized antenna. With the development of science and technology, a user's requirements on performance of communication devices are gradually increasing. How to further improve the antenna performance of the communication device is one of the directions that researchers in the art are striving for.

SUMMARY

The disclosure provides a multiple polarized dish antenna, which may have multiple polarization directions, so that the multiple polarized dish antenna in the disclosure may receive signals from different directions, thereby improving antenna performance.

A multiple polarized dish antenna in the disclosure includes a main dish reflector and a multiple polarized antenna source. The main dish reflector includes an inner concave surface. The multiple polarized antenna source is at least partially disposed beside the inner concave surface. The inner concave surface of the main dish reflector reflects a radiation energy emitted by the multiple polarized antenna source. The multiple polarized antenna source includes a carrier, at least one radiator, and multiple feeding portions. The carrier has a conductive layer. The at least one radiator is disposed above the carrier, and a resonance gap is between the at least one radiator and the conductive layer. The feeding portions are disposed beside the at least one radiator. A projection of each of the feeding portions on a plane where the corresponding radiator is located is at least partially overlapped with the radiator. Each of the feeding portions is insulated from the conductive layer. A number of the feeding portions is greater than 2.

In an embodiment of the disclosure, the at least one radiator is one radiator. The feeding portions are disposed below the radiator. Each of the feeding portions is at least partially shielded below the radiator. The multiple polarized dish antenna includes at least one ground portion disposed on the carrier and electrically connected to the conductive layer.

In an embodiment of the disclosure, the at least one radiator includes multiple radiators disposed perpendicular to the carrier. A number of the radiators is greater than 2. The feeding portions correspond to the radiators respectively. Each of the feeding portions includes a microstrip line. The multiple polarized dish antenna resonates at an antenna frequency band. Each of the radiators is a dipole antenna. A length of each of the radiators is 0.5 times a wavelength of the antenna frequency band, and a height is between 0.25 times the wavelength and 0.5 times the wavelength.

In an embodiment of the disclosure, the multiple polarized dish antenna resonates at an antenna frequency band, and a distance between the carrier and the at least one radiator is 0.08 times a wavelength to 0.5 times the wavelength of the antenna frequency band.

In an embodiment of the disclosure, the multiple polarized dish antenna resonates at an antenna frequency band. A diameter of the main dish reflector is between 5 times a wavelength and 10 times the wavelength of the antenna frequency band, and a height of the main dish reflector on an axis passing through a center of the inner concave surface is between 1 times a wavelength and 5 times the wavelength of the antenna frequency band.

In an embodiment of the disclosure, the multiple polarized dish antenna further includes a secondary reflector disposed beside the inner concave surface. The at least one radiator faces the secondary reflector, and the radiation energy emitted by the multiple polarized antenna source is reflected by the secondary reflector to the inner concave surface, and is reflected by the inner concave surface.

In an embodiment of the disclosure, the main dish reflector includes an axis passing through a center of the inner concave surface. The multiple polarized antenna source is located at the center of the inner concave surface, and the secondary reflector is located on the axis.

In an embodiment of the disclosure, the secondary reflector includes a reflective convex surface, and the reflective convex surface faces the inner concave surface and the multiple polarized antenna source.

In an embodiment of the disclosure, the secondary reflector includes a reflective concave surface, and the reflective concave surface faces the inner concave surface and the multiple polarized antenna source.

In an embodiment of the disclosure, the multiple polarized dish antenna resonates at an antenna frequency band, and a farthest distance between the secondary reflector and a center of the inner concave surface of the main dish reflector is a square of a diameter of the main dish reflector/(16*a height of the main dish reflector on an axis passing through the center).

In an embodiment of the disclosure, the multiple polarized dish antenna further includes a hollow waveguide member surrounding at least a portion of the multiple polarized antenna source, and a height of the hollow waveguide member protruding from the inner concave surface is greater than a height of the at least one radiator protruding from the inner concave surface.

In an embodiment of the disclosure, the multiple polarized dish antenna resonates at an antenna frequency band. A diameter of the hollow waveguide member is between 0.5 times a wavelength and 5 times the wavelength of the antenna frequency band. A height of the hollow waveguide member is between 0.5 times the wavelength and 5 times the wavelength of the antenna frequency band.

In an embodiment of the disclosure, the multiple polarized antenna source is located on a focal point of the inner concave surface, and the at least one radiator faces the inner concave surface.

In an embodiment of the disclosure, the main dish reflector includes an axis passing through a center of the inner concave surface. The multiple polarized antenna source is located on the axis.

In an embodiment of the disclosure, the multiple polarized dish antenna further includes a hollow waveguide member at least surrounding the at least one radiator. The multiple polarized dish antenna resonates at an antenna frequency band. A diameter of the hollow waveguide member is between 0.5 times a wavelength and 5 times the wavelength of the antenna frequency band. A height of the hollow waveguide is between 0.5 times the wavelength and 5 times the wavelength of the antenna frequency band.

Based on the above, the multiple polarized antenna source of the multiple polarized dish antenna in the disclosure is at least partially disposed beside the inner concave surface of the main dish reflector. The inner concave surface of the main dish reflector reflects the radiation energy emitted by the multiple polarized antenna source. The resonance gap is between the radiator of the multiple polarized antenna source and the conductive layer. The projection of the feeding portion on the plane where the corresponding radiator is located is at least partially overlapped with the radiator, and the number of the feeding portions is greater than two. Through the above configuration, the multiple polarized dish antenna in the disclosure may have the multiple polarized performance to receive the signals from different directions, thereby improving the antenna performance.

DETAILED DESCRIPTION OF DISCLOSED EMBODIMENTS

Figure 1A:
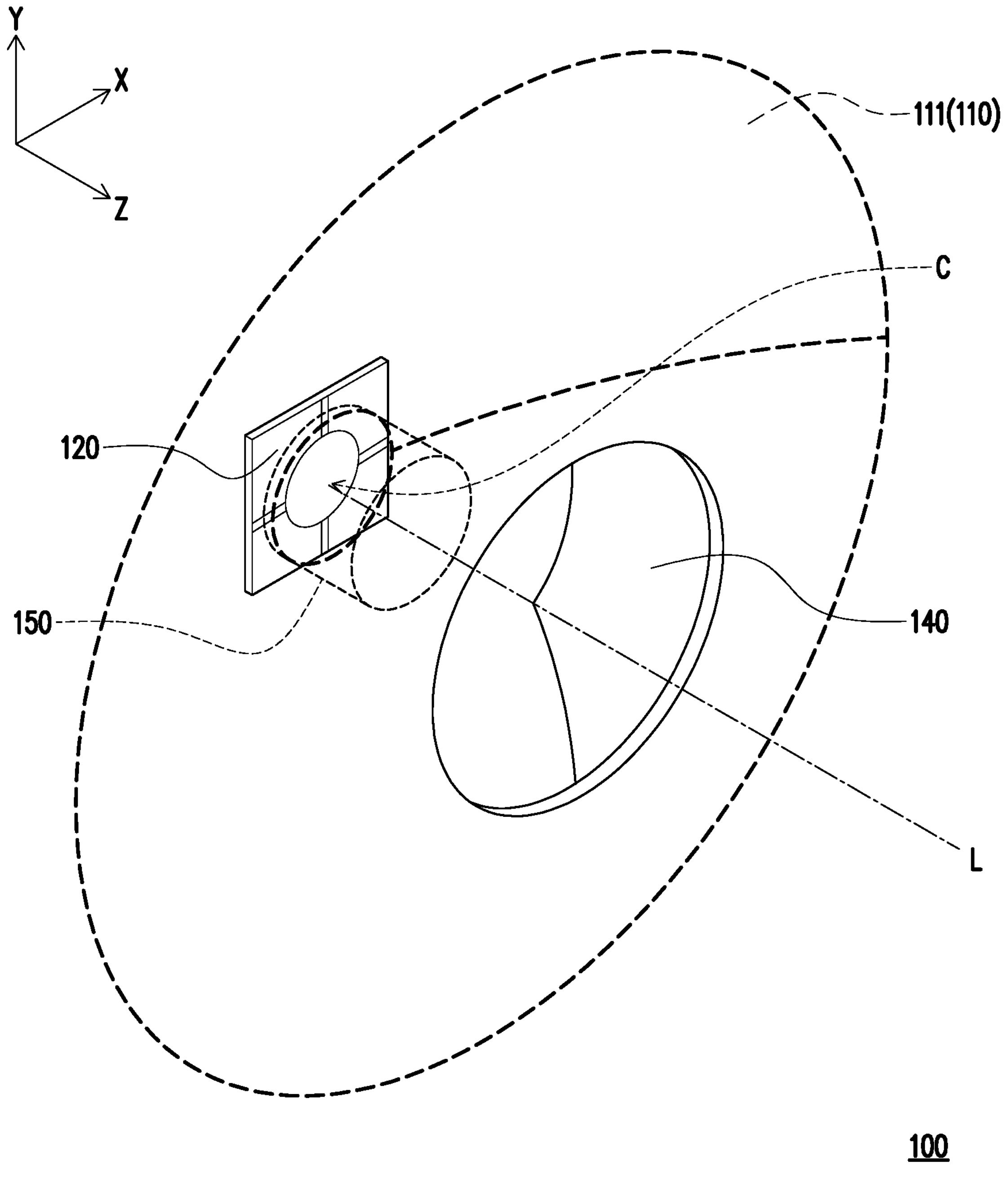
FIG. 1A is a schematic view of an appearance of a multiple polarized dish antenna according to the first embodiment of the disclosure.
Figure 1B:
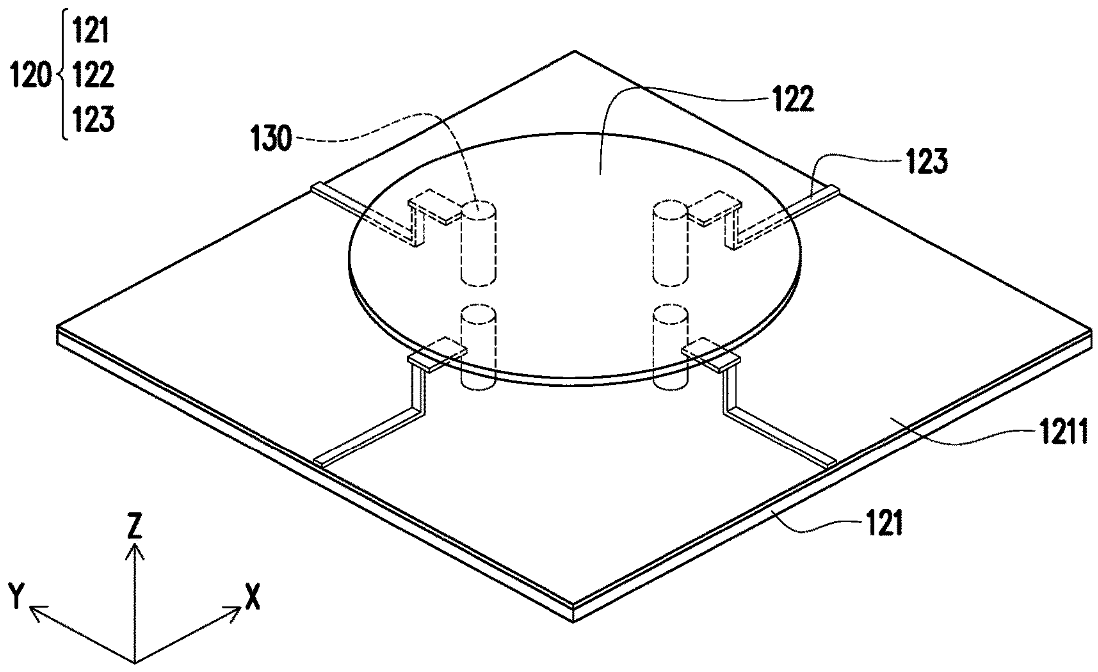
FIG. 1B is a schematic view of an appearance of a multiple polarized antenna source and a ground portion in FIG. 1A.
Figure 1C:
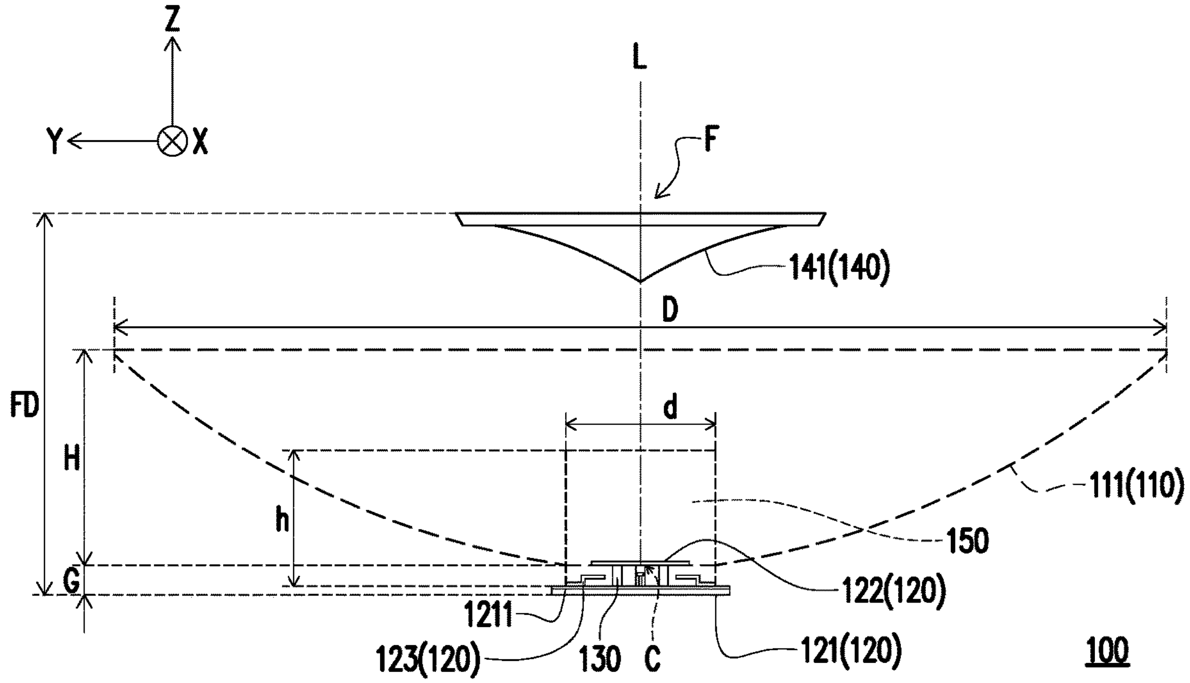
FIG. 1C is a side perspective view of the multiple polarized dish antenna in FIG. 1A.

FIG. 1A is a schematic view of an appearance of a multiple polarized dish antenna according to the first embodiment of the disclosure. FIG. 1B is a schematic view of an appearance of a multiple polarized antenna source and a ground portion in FIG. 1A. FIG. 1C is a side perspective view of the multiple polarized dish antenna in FIG. 1A. It should be noted that a main dish reflector 110 and a hollow waveguide member 150 in FIGS. 1A and 1C are drawn in perspective in order to clearly understand relative positions of elements.

Referring to FIGS. 1A to 1C, a multiple polarized dish antenna 100 in this embodiment is adapted to resonate at an antenna frequency band, and the antenna frequency band is between 4.9 GHz and 7.2 GHz, so that the multiple polarized dish antenna 100 may be applied to different working frequency bands (such as LTE frequency band, Wi-Fi 5G, Wi-Fi 6G, and other frequency bands). Main components of the multiple polarized dish antenna 100 in this embodiment are introduced below.

The multiple polarized dish antenna 100 in this embodiment includes the main dish reflector 110 and a multiple polarized antenna source 120. The main dish reflector 110 includes an inner concave surface 111 and an axis L passing through a center C of the inner concave surface 111. The inner concave surface 111 is configured to reflect a radiation energy emitted by the multiple polarized antenna source 120.

A diameter D (FIG. 1C) of the main dish reflector 110 is between 5 times a wavelength and 10 times the wavelength of the antenna frequency band. A height H (FIG. 1C) of the main dish reflector 110 on the axis L is between 1 times the wavelength and 5 times the wavelength of the antenna frequency band. It should be noted that the diameter D of the main dish reflector 110 may be adjusted according to specifications. When the diameter D is greater, a size of the overall multiple polarized dish antenna 100 is larger, and a gain of the multiple polarized dish antenna 100 is also greater. In addition, a position of a focal point F may be adjusted by adjusting the height H of the main dish reflector 110.

The multiple polarized antenna source 120 includes a carrier 121, at least one radiator 122, and multiple feeding portions 123. The carrier 121 has a conductive layer 1211, and the carrier 121 is located behind the main dish reflector 110. Specifically, the carrier 121 is not located in a direction facing the inner concave surface 111 (for example, a Z-axis direction in FIG. 1C), but is located behind the inner concave surface 111.

In addition, the carrier 121 may be a casing, an internal structure, or other suitable parts of a communication device, so as to provide the radiator 122 and the feeding portion 123. A material of the carrier 121 is, for example, an insulating substrate material of a printed circuit board, plastic, a ceramic material, or other suitable materials, but the disclosure is not limited thereto.

The at least one radiator 122 is one radiator 122, and is disposed above the carrier 121 (with the Z-axis in the drawing as the top). A resonance gap G (FIG. 1C) is between the conductive layer 1211 of the carrier 121 and the at least one radiator 122. A distance of the resonance gap G is between 0.08 times the wavelength and 0.5 times the wavelength of the antenna frequency band. It should be noted that the distance of the resonance gap G may be adjusted according to an antenna type, a frequency, and a bandwidth of the multiple polarized dish antenna 100.

The feeding portions 123 are disposed beside the at least one radiator 122, and a projection of each of the feeding portions 123 on a plane where the corresponding radiator 122 is located is at least partially overlapped with the radiator 122. Specifically, as shown in FIGS. 1B and 1C, the feeding portion 123 is disposed below the radiator 122 (with the Z-axis in the drawing as the top), and each of the feeding portions 123 is at least partially shielded below the radiator 122.

Each of the feeding portions 123 is insulated from the conductive layer 1211. The number of the feeding portions 123 is greater than two. In this embodiment, the number of the feeding portions 123 is four, and as shown in FIG. 1B, extending directions of the two adjacent feeding portions 123 are perpendicular to each other. Through the configuration of the feeding portions 123, the multiple polarized dish antenna 100 (FIG. 1A) in this embodiment may be used as multiple linear polarized antennas (horizontal polarization and vertical polarization), and may also be used as a circular polarized antenna by generating a phase difference through a circuit. Therefore, the multiple polarized dish antenna 100 may have multiple polarized performance to receive signals from different directions, thereby improving antenna performance.

Referring to FIG. 1C, the multiple polarized antenna source 120 is located at the center C of the inner concave surface 111 and is at least partially disposed beside the inner concave surface 111. Specifically, the radiator 122 of the multiple polarized antenna source 120 in this embodiment is embedded in a bottom of the inner concave surface 111 and protrudes from the inner concave surface 111. That is, the radiator 122 of the multiple polarized antenna source 120 in this embodiment is located in a dish groove of the main dish reflector 110, and is located beside the inner concave surface 111.

In addition, the multiple polarized dish antenna 100 in this embodiment includes at least one ground portion 130 disposed on the carrier 121 and electrically connected to the conductive layer 1211. Specifically, the at least one ground portion 130 in this embodiment is four columnar ground portions 130, and each of the ground portions 130 is disposed corresponding to the feeding portion 123. The ground portions 130 of the multiple polarized dish antenna 100 in this embodiment may be used as an isolation mechanism between the feeding portions 123 to reduce resonance interference between the four feeding portions 123 and the radiator 122 respectively, thereby improving isolation between the four feeding portions 123.

The multiple polarized dish antenna 100 in this embodiment further includes a secondary reflector 140. The secondary reflector 140 includes a reflective convex surface 141. Referring to FIG. 1C, the secondary reflector 140 is located on the axis L passing through the inner concave surface 111 and on the focal point F of the inner concave surface 111, and is disposed beside the inner concave surface 111. Specifically, the secondary reflector 140 and the inner concave surface 111 of the main dish reflector 110 face each other. The secondary reflector 140 is not surrounded by the inner concave surface 111, and has a distance from the main dish reflector 110. That is, the secondary reflector 140 in this embodiment is located outside the main dish reflector 110 and is located beside the inner concave surface 111.

Continuing to refer to FIG. 1C, a farthest distance FD between the secondary reflector 140 and the center C of the inner concave surface 111 of the main dish reflector 110 is the square of the diameter D of the main dish reflector 110/(16*the height H of the main dish reflector 110 on the axis L passing through the center C). In addition, the at least one radiator 122 of the multiple polarized antenna source 120 faces the reflective convex surface 141 of the secondary reflector 140, and the reflective convex surface 141 faces the inner concave surface 111 and the multiple polarized antenna source 120. When the radiation energy emitted by the multiple polarized antenna source 120 is reflected to the inner concave surface 111 by the reflective convex surface 141 of the secondary reflector 140, the radiation energy is reflected to the outside by the inner concave surface 111.

The multiple polarized dish antenna 100 in this embodiment further includes the hollow waveguide member 150 surrounding at least a portion of the multiple polarized antenna source 120. As shown in FIG. 1C, the hollow waveguide member 150 surrounds the radiator 122 and the feeding portion 123 of the multiple polarized antenna source 120, and a height of the hollow waveguide member 150 protruding from the inner concave surface 111 is greater than a height of the at least one radiator 122 protruding from the inner concave surface 111. Through the above configuration, the hollow waveguide member 150 may improve the antenna performance of the multiple polarized dish antenna 100.

In addition, a diameter d of the hollow waveguide member 150 in this embodiment is between 0.5 times the wavelength and 5 times the wavelength of the antenna frequency band, and a height h of the hollow waveguide member 150 is between 0.5 times the wavelength and 5 times the wavelength of the antenna frequency band.

Through experiments, the multiple polarized dish antenna 100 in this embodiment has characteristics such as a good bandwidth ratio (greater than 40%), high gain, small beam pointing deviation (a deviation angle less than 1 degree), and good antenna isolation (the isolation greater than 10 dB) in the same frequency band. Therefore, the multiple polarized dish antenna 100 in this embodiment has good antenna performance.

Figure 2A:
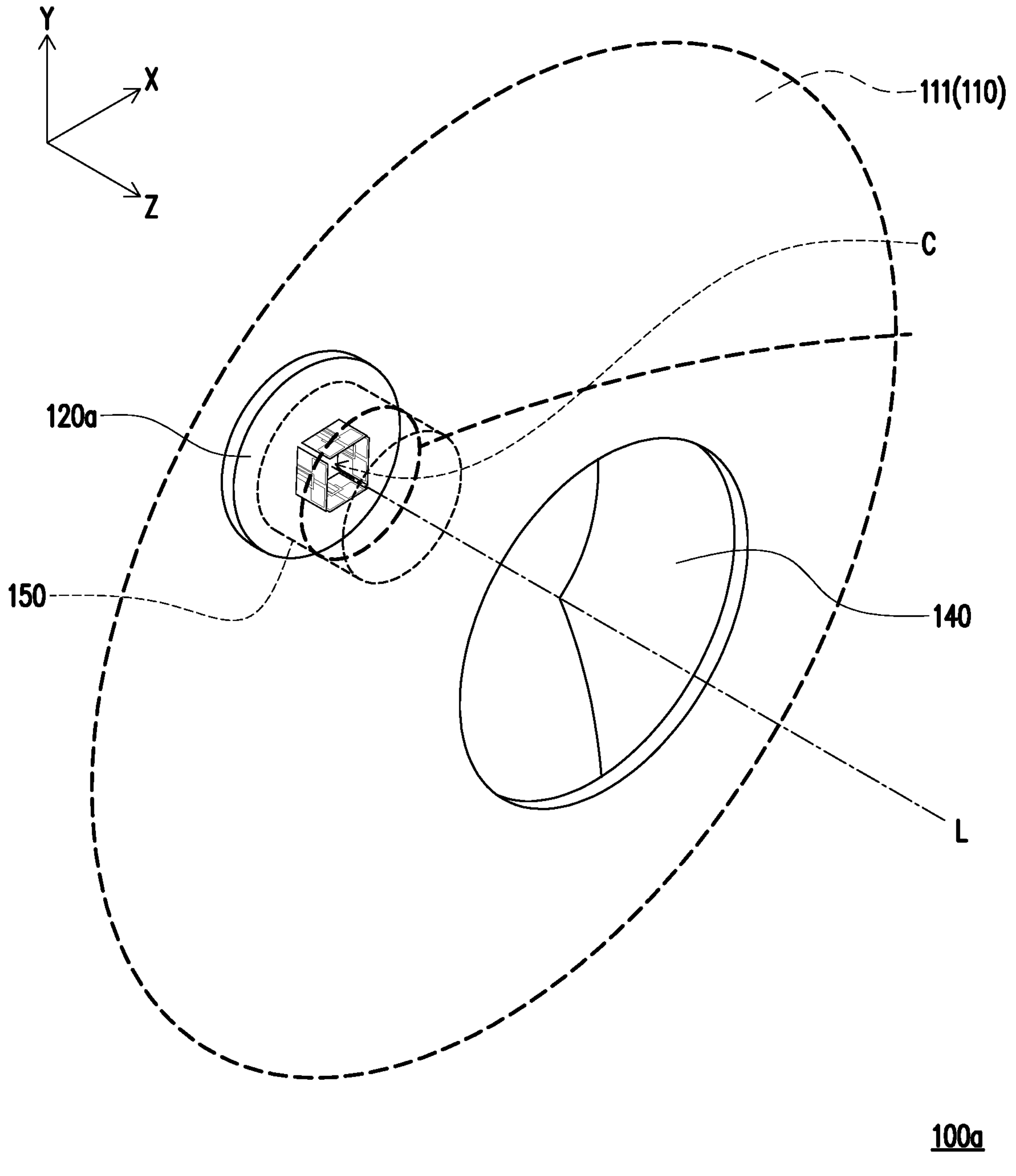
FIG. 2A is a schematic view of an appearance of a multiple polarized dish antenna according to the second embodiment of the disclosure.
Figure 2B:
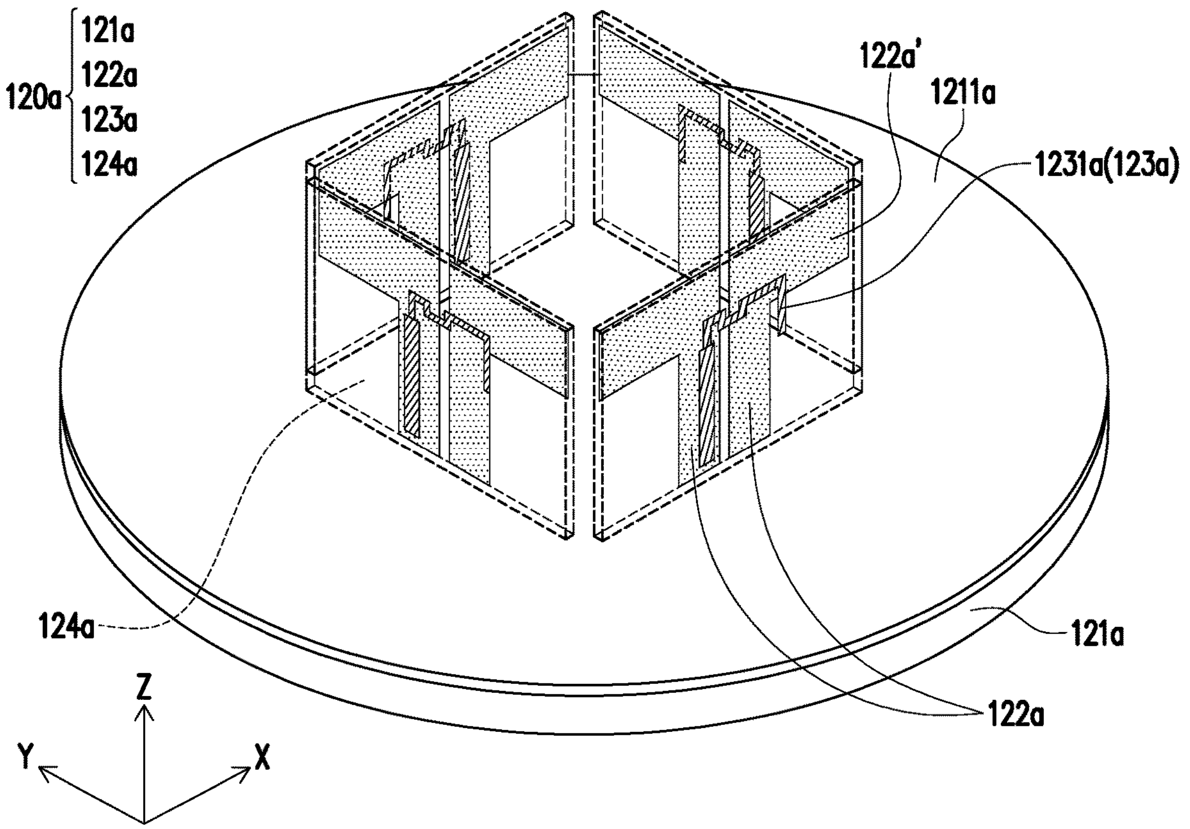
FIG. 2B is a schematic view of an appearance of a multiple polarized antenna source in FIG. 2A.
Figure 2C:
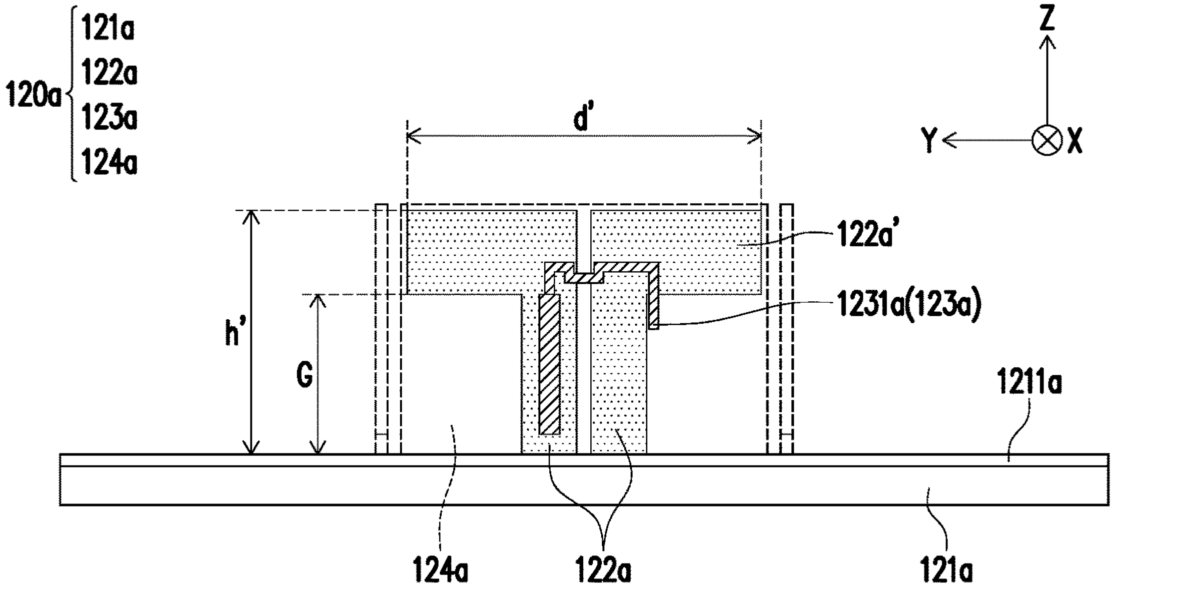
FIG. 2C is a schematic side view of the multiple polarized antenna source in FIG. 2B.
Figure 2D:
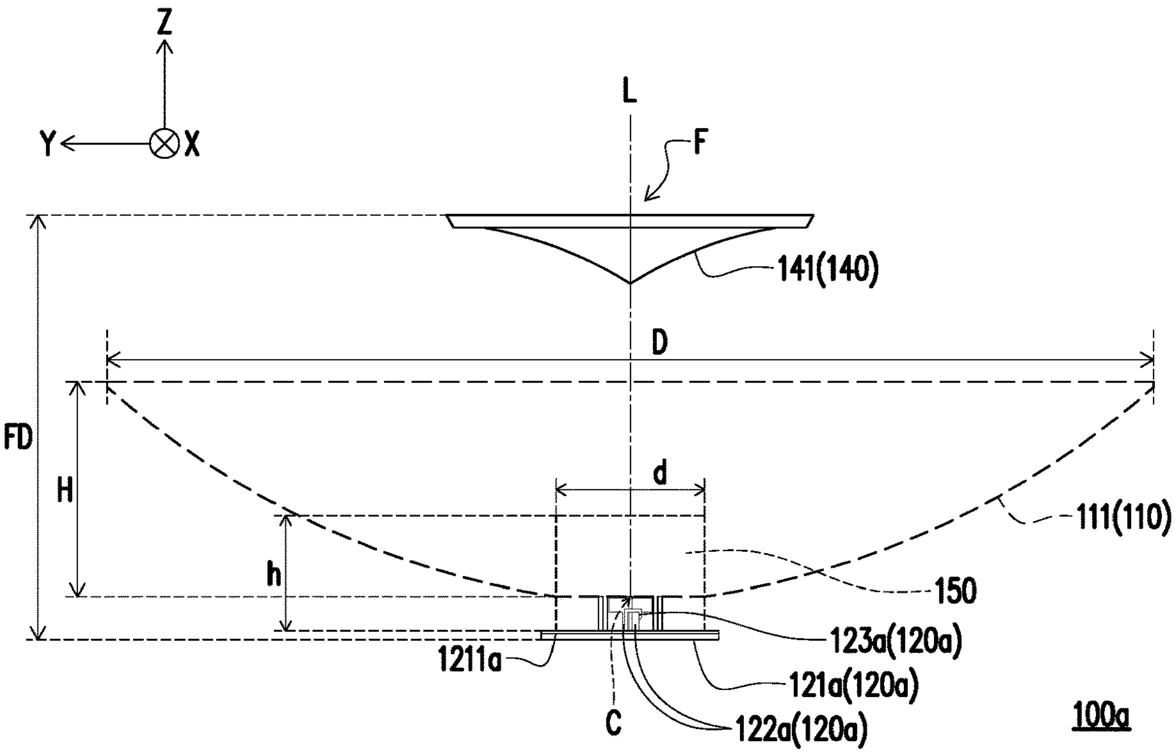
FIG. 2D is a side perspective view of the multiple polarized dish antenna in FIG. 2A.

FIG. 2A is a schematic view of an appearance of a multiple polarized dish antenna according to the second embodiment of the disclosure. FIG. 2B is a schematic view of an appearance of a multiple polarized antenna source in FIG. 2A. FIG. 2C is a schematic side view of the multiple polarized antenna source in FIG. 2B. FIG. 2D is a side perspective view of the multiple polarized dish antenna in FIG. 2A.

Referring to FIGS. 2A to 2D, a structure of a multiple polarized dish antenna 100*a* in this embodiment is substantially the same as a structure of the multiple polarized dish antenna 100 in the first embodiment. A difference between the two is that a structure of a multiple polarized antenna source 120*a* of the multiple polarized dish antenna 100*a* in this embodiment is different from a structure of the multiple polarized antenna source 120 of the multiple polarized dish antenna 100 in the first embodiment.

In detail, referring to FIGS. 2B and 2C, the multiple polarized dish antenna 100*a* in this embodiment resonate at an antenna frequency band, and the antenna frequency band is between 4.9 GHZ and 7.2 GHz. That is to say, the multiple polarized dish antenna 100*a* in this embodiment may also be applied to different working frequency bands.

The multiple polarized antenna source 120*a* of the multiple polarized dish antenna 100*a* in this embodiment includes a carrier 121*a*, at least one radiator 122*a*, and multiple feeding portions 123*a*. The carrier 121*a* has a conductive layer 1211*a*. The at least one radiator 122*a* includes multiple radiators and is disposed on the carrier 121*a*. The radiators 122*a* may be disposed perpendicular to the carrier 121*a*, and the radiators 122*a* are disposed on multiple printed circuit boards 124*a*. In addition, the number of the radiators is greater than two. In this embodiment, the number of the radiators 122*a* is, for example, four, but the disclosure is not limited thereto.

Each of the radiators 122*a* is a dipole antenna and includes two symmetrical sub-radiators 122*a*'. The two sub-radiators 122*a*' are located on the same plane, so that each of the radiators 122*a* has a T-shaped appearance. A length d' (FIG. 2C) of each of the radiators 122*a* is 0.5 times the wavelength of the antenna frequency band, and a height h' (FIG. 2C) is between 0.25 times the wavelength and 0.5 times the wavelength. In addition, as shown in FIG. 2C, the resonance gap G is between the conductive layer 1211*a* of the carrier 121*a* and the radiator 122*a*, and the distance of the resonance gap G is between 0.08 times the wavelength and 0.5 times the wavelength of the antenna frequency band.

The feeding portions 123*a* are disposed beside the radiators 122*a* corresponding to the radiators 122*a*, and a projection of each of the feeding portions 123*a* on a plane where the corresponding radiator 122*a* is located is at least partially overlapped with the radiator 122*a*. The number of the feeding portions 123*a* is also, for example, four, but the disclosure is not limited thereto. It should be noted that the feeding portion 123*a* is adapted to feed signals into the radiator 122*a*, but the feeding portion 123*a* is not connected to the radiator 122*a*.

In addition, the feeding portions 123*a* include a microstrip line 1231*a*. The multiple polarized dish antenna 100*a* in this embodiment is fed through the microstrip line 1231*a* for antenna impedance matching. In other embodiments, coplanar waveguide or grounded coplanar waveguide (CPW or CPWG) may also be used as antenna impedance matching. However, the disclosure is not limited thereto.

Through the above configuration, the multiple polarized dish antenna 100*a* in this embodiment may also have the multiple polarized performance to receive the signals from different directions, thereby improving the antenna performance.

In addition, through the experiments, the multiple polarized dish antenna 100*a* in this embodiment also has the characteristics such as the good bandwidth ratio (greater than 40%), high gain, and small beam pointing deviation (the deviation angle less than 1 degree) in the same frequency band, and has the good antenna performance.

In addition, it should be noted that the multiple polarized antenna source in the disclosure is not limited to the structures of the multiple polarized antenna source 120 in the first embodiment and the multiple polarized antenna source 120*a* in the second embodiment. That is, in other embodiments, the structure of the multiple polarized antenna source may be different from the structures of the multiple polarized antenna sources 120 and 120*a*, as long as the multiple polarized antenna source has a structure that may generate a multiple polarized mode.

Figure 3A:
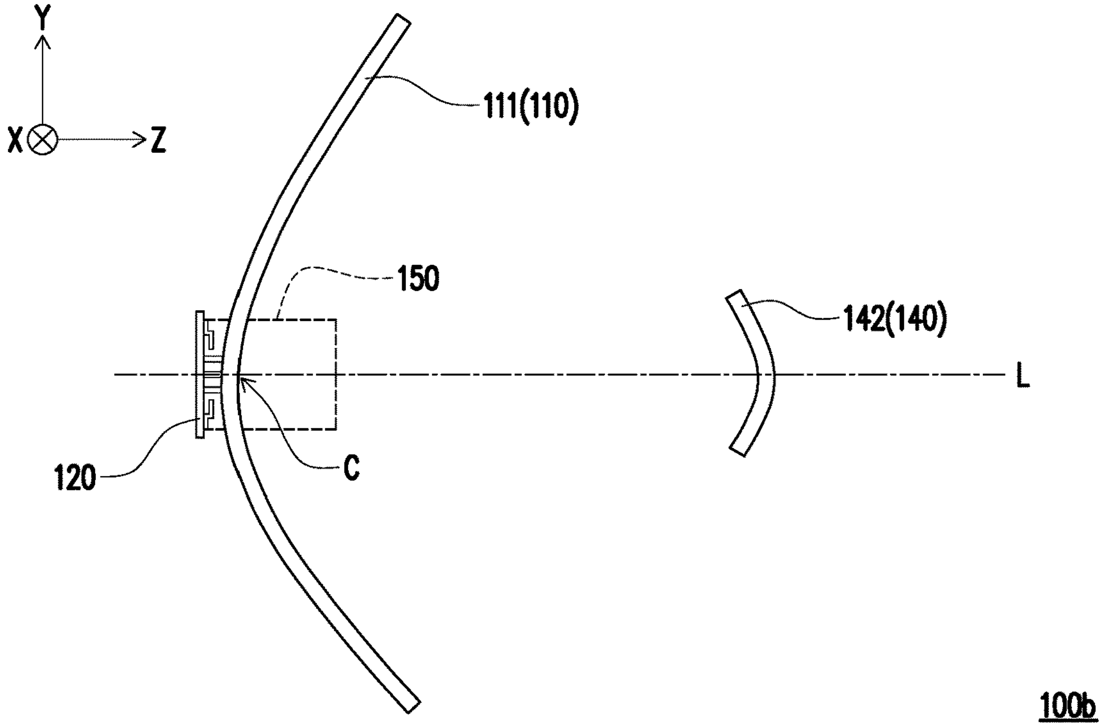
FIG. 3A is a schematic side view of a multiple polarized dish antenna according to the third embodiment of the disclosure.
Figure 3B:
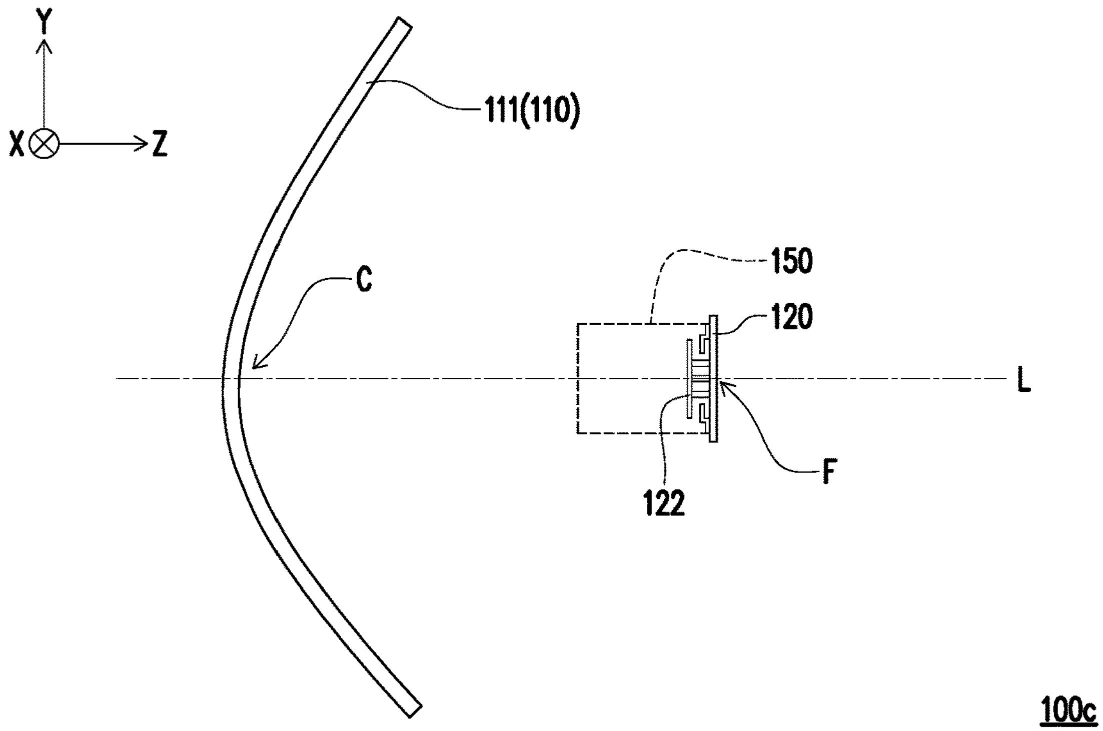
FIG. 3B is a schematic side view of a multiple polarized dish antenna according to the fourth embodiment of the disclosure.
Figure 3C:
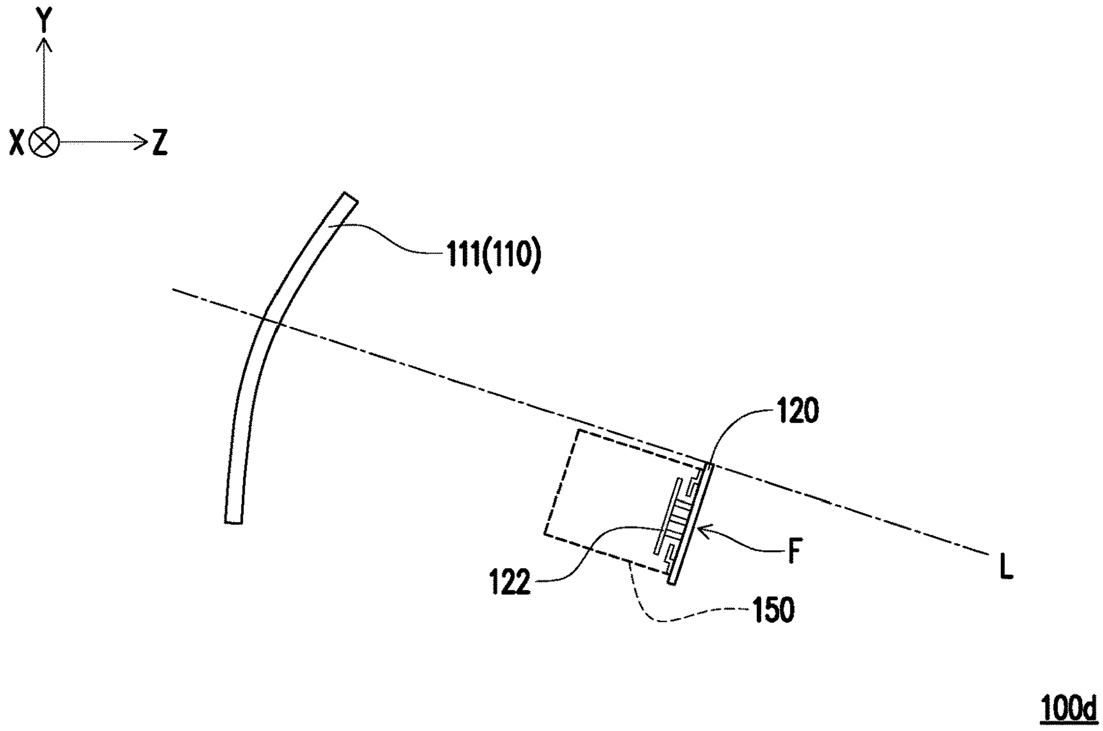
FIG. 3C is a schematic side view of a multiple polarized dish antenna according to the fifth embodiment of the disclosure.

FIG. 3A is a schematic side view of a multiple polarized dish antenna according to the third embodiment of the disclosure. FIG. 3B is a schematic side view of a multiple polarized dish antenna according to the fourth embodiment of the disclosure. FIG. 3C is a schematic side view of a multiple polarized dish antenna according to the fifth embodiment of the disclosure.

Referring to FIGS. 1C, 2D, and 3A to 3C, the multiple polarized dish antennas 100 and 100*a* in the first embodiment and the second embodiment are dish antenna configurations of a Cassegrain antenna. The multiple polarized dish antennas 100*b*, 100*c*, and 100*d* in the third embodiment, the fourth embodiment, and the fifth embodiment of FIGS. 3A to 3C are dish antenna configurations of a Gregorian antenna, an axial dish antenna, and an offset dish antenna, respectively. A difference between the multiple polarized dish antennas 100*b*, 100*c*, 100*d* in the third embodiment, the fourth embodiment, and the fifth embodiment and the multiple polarized dish antennas 100 and 100*a* in the first embodiment and the second embodiment will be described below.

Referring to FIG. 3A first, the difference between the multiple polarized dish antenna 100*b* in the third embodiment and the multiple polarized dish antennas 100 and 100*a* in the first and second embodiments is that a secondary reflector 140*b* in this embodiment includes a reflective concave surface 142, and the reflective concave surface 142 faces the inner concave surface 111 and the multiple polarized antenna source 120. Although the appearance is different, the reflective concave surface 142 of the secondary reflector 140 in this embodiment also reflects the radiation energy emitted by the multiple polarized antenna source 120 to the inner concave surface 111, so that the radiation energy is reflected to the outside through the inner concave surface 111.

Referring to FIG. 3B, the difference between the multiple polarized dish antenna 100*c* in the fourth embodiment and the multiple polarized dish antennas 100 and 100*a* in the first and second embodiments is that the multiple polarized dish antenna 100*c* in this embodiment does not have a secondary reflector, and a position of the multiple polarized antenna source 120 of the multiple polarized dish antenna 100*c* is also different. Specifically, the multiple polarized antenna source 120 of the multiple polarized dish antenna 100*c* in this embodiment is located on the focal point F of the inner concave surface 111, and the multiple polarized antenna source 120 is also located on the axis L passing through the center C of the inner concave surface 111. In addition, the radiator 122 of the multiple polarized antenna source 120 faces the inner concave surface 111.

Referring to FIG. 3C, the difference between the multiple polarized dish antenna 100*d* in the fifth embodiment and the multiple polarized dish antenna 100*c* in the fourth embodiment is that the multiple polarized antenna source 120 in this embodiment is located on the focal point F of the inner concave surface 111, but not on the axis L of the main dish reflector 110.

Both the multiple polarized dish antennas 100*c* and 100*d* in the fourth embodiment and the fifth embodiment do not have the secondary reflector, and the radiators 122 both face the inner concave surface 111. When the multiple polarized antenna source 120 in the fourth embodiment and the fifth embodiment emits the radiation energy toward the inner concave surface 111, the radiation energy is directly reflected by the inner concave surface 111 to the outside.

It should be supplemented that the multiple polarized dish antennas 100, 100*b*, 100*c*, and 100*d* in the first embodiment, the third embodiment, the fourth embodiment, and the fifth embodiment all have good antenna performance. The Cassegrain antenna of the multiple polarized dish antenna 100 in the first embodiment has the least beam pointing deviation.

Figure 4A:
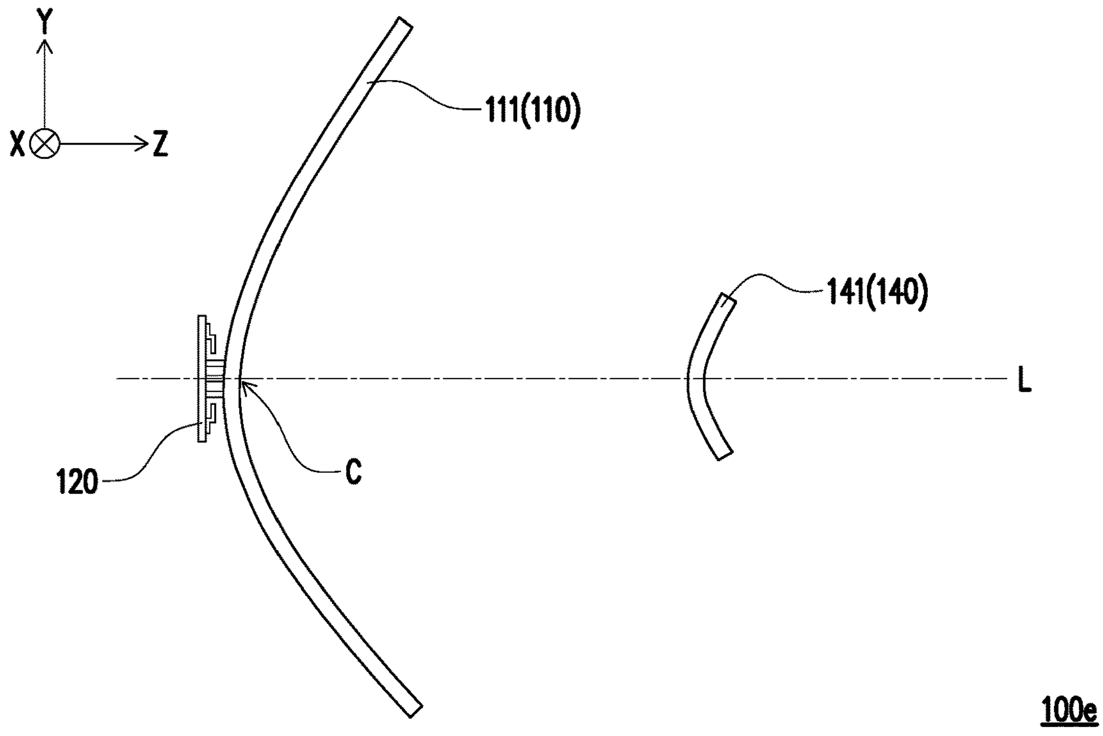
FIG. 4A is a schematic side view of a multiple polarized dish antenna according to the sixth embodiment of the disclosure.
Figure 4B:
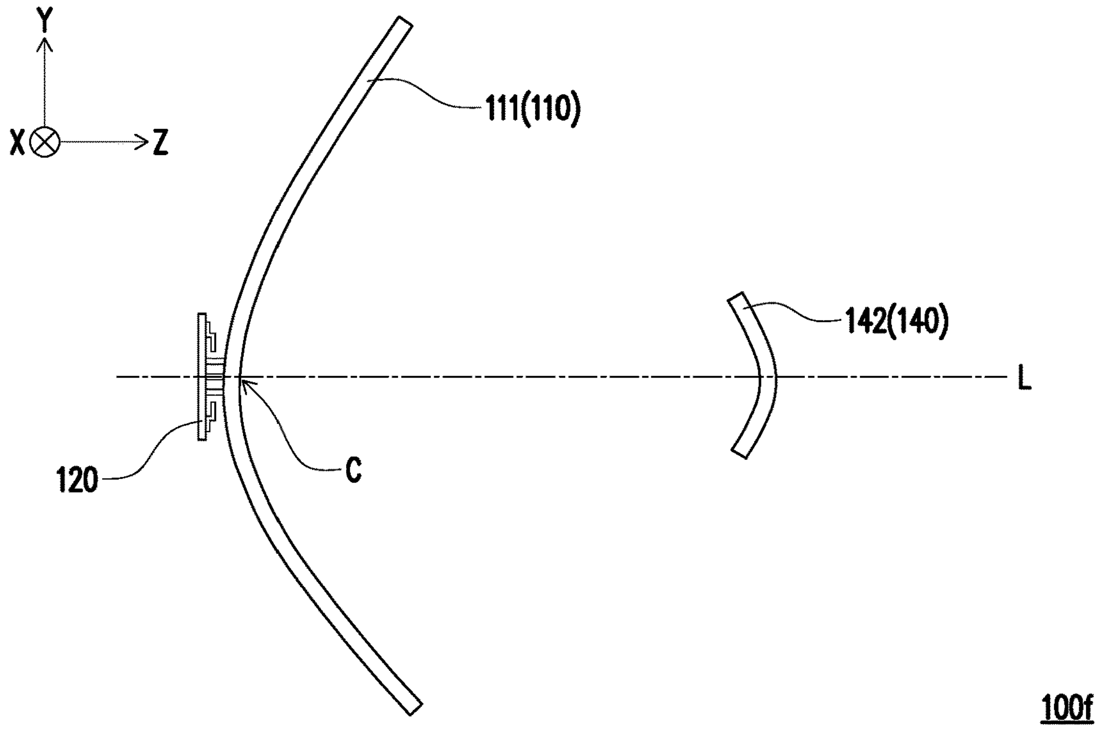
FIG. 4B is a schematic side view of a multiple polarized dish antenna according to the seventh embodiment of the disclosure.
Figure 4C:
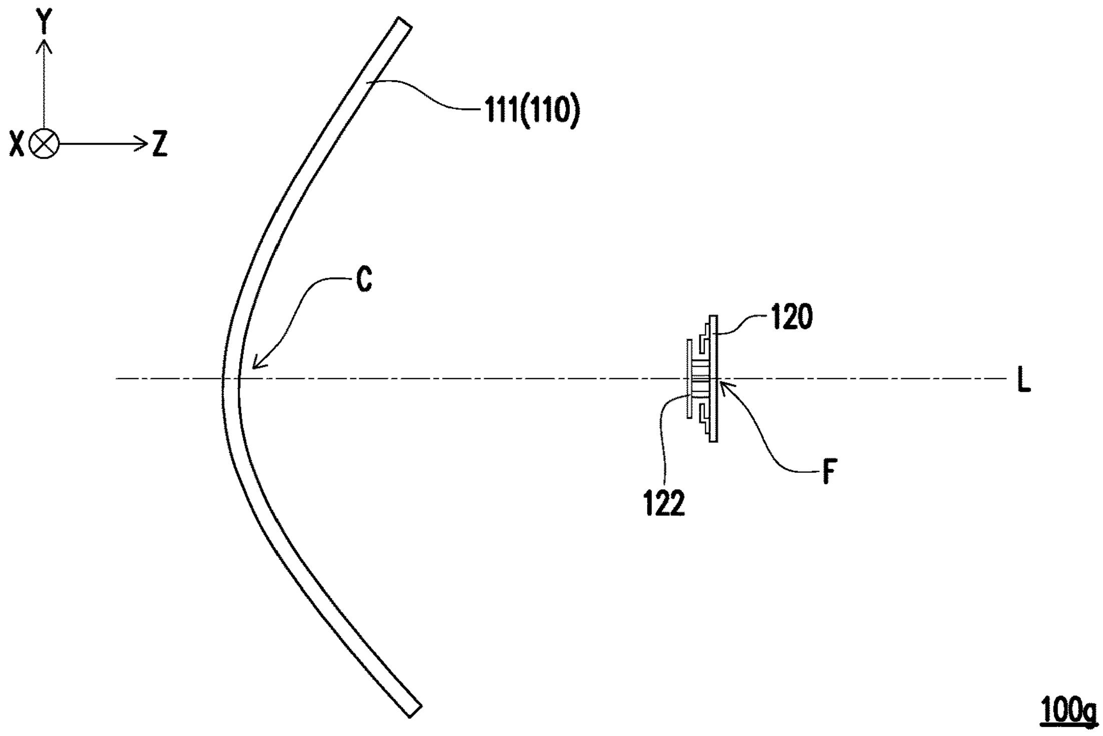
FIG. 4C is a schematic side view of a multiple polarized dish antenna according to the eighth embodiment of the disclosure.
Figure 4D:
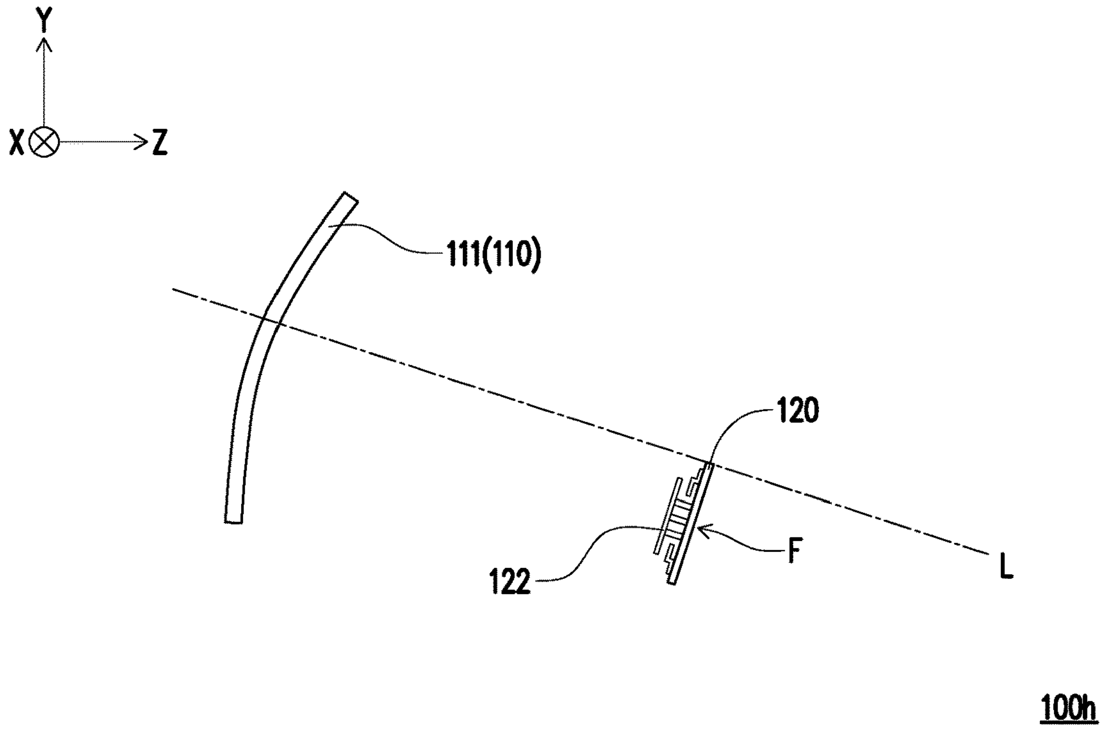
FIG. 4D is a schematic side view of a multiple polarized dish antenna according to the ninth embodiment of the disclosure.

FIG. 4A is a schematic side view of a multiple polarized dish antenna according to the sixth embodiment of the disclosure. FIG. 4B is a schematic side view of a multiple polarized dish antenna according to the seventh embodiment of the disclosure. FIG. 4C is a schematic side view of a multiple polarized dish antenna according to the eighth embodiment of the disclosure. FIG. 4D is a schematic side view of a multiple polarized dish antenna according to the ninth embodiment of the disclosure.

Referring to FIGS. 4A to 4D, structures of multiple polarized dish antennas 100*e*, 100*f*, 100*g*, and 100*h* in the sixth embodiment to the ninth embodiment are respectively the same as structures of the multiple polarized dish antennas 100, 100*b*, 100*c*, and 100*d* in the first embodiment, the third embodiment, the fourth embodiment, and the fifth embodiment. The difference is that compared to the multiple polarized dish antennas 100, 100*b*, 100*c*, and 100*d* in the first embodiment, the third embodiment, the fourth embodiment, and the fifth embodiment, the multiple polarized dish antennas 100*e*, 100*f*, 100*g*, and 100*h* in the sixth to ninth embodiments do not have the hollow waveguide member 150.

It should be supplemented that, as shown in FIGS. 3A to 4D, the multiple polarized antenna source 120 of the multiple polarized dish antennas 100*b*, 100*c*, 100*d*, 100*e*, 100*f*, 100*g*, and 100*h* in the third to the ninth embodiments is the same as the multiple polarized antenna source 120 of the multiple polarized dish antenna 100 in the first embodiment. However, in other embodiments, the multiple polarized antenna source 120*a* in the second embodiment or other multiple polarized antenna sources that may generate the multiple polarized mode may also be used for the multiple polarized dish antennas 100*b*, 100*c*, 100*d*, 100*e*, 100*f*, 100*g*, and 100*h* in the third to the ninth embodiments. The disclosure is not limited thereto.

Based on the above, the multiple polarized antenna source of the multiple polarized dish antenna in the disclosure is at least partially disposed beside the inner concave surface of the main dish reflector. The inner concave surface of the main dish reflector reflects the radiation energy emitted by the multiple polarized antenna source. The resonance gap is between the radiator of the multiple polarized antenna source and the conductive layer. The projection of the feeding portion on the plane where the corresponding radiator is located is at least partially overlapped with the radiator, and the number of the feeding portions is greater than two. Through the above configuration, the multiple polarized dish antenna in the disclosure may have the multiple polarized performance to receive the signals from different directions, thereby improving the antenna performance. In addition, the multiple polarized dish antenna in the disclosure has the characteristics such as the good bandwidth ratio, high gain, small beam pointing deviation, and good antenna isolation.

What is claimed is:

1. A multiple polarized dish antenna, comprising:

a main dish reflector comprising an inner concave surface; and a multiple polarized antenna source at least partially disposed beside the inner concave surface, wherein the inner concave surface of the main dish reflector reflects a radiation energy emitted by the multiple polarized antenna source, and the multiple polarized antenna source comprises:

a carrier having a conductive layer;

at least one radiator disposed above the carrier, wherein a resonance gap is between the at least one radiator and the conductive layer;

a plurality of feeding portions disposed beside the at least one radiator, wherein a projection of each of the feeding portions on a plane where the corresponding radiator is located is at least partially overlapped with the radiator, each of the feeding portions is insulated from the conductive layer, and a number of the feeding portions is greater than 2, the multiple polarized dish antenna resonates at an antenna frequency band, and the resonance gap is 0.08 times a wavelength to 0.5 times the wavelength of the antenna frequency band; and a hollow waveguide member surrounding at least a portion of the multiple polarized antenna source, a diameter of the hollow waveguide member is between 0.5 times a wavelength and 5 times the wavelength of the antenna frequency band, and a height of the hollow waveguide member is between 0.5 times the wavelength and 5 times the wavelength of the antenna frequency band.

2. The multiple polarized dish antenna according to claim 1, wherein the at least one radiator is one radiator, the feeding portions are disposed below the radiator, each of the feeding portions is at least partially shielded below the radiator, and the multiple polarized dish antenna comprises at least one ground portion disposed on the carrier and electrically connected to the conductive layer.

3. The multiple polarized dish antenna according to claim 1, wherein the at least one radiator comprises a plurality of radiators disposed perpendicular to the carrier, a number of the radiators is greater than 2, the feeding portions correspond to the radiators respectively, each of the feeding portions comprises a microstrip line, each of the radiators is a dipole antenna, a length of each of the radiators is 0.5 times a wavelength of the antenna frequency band, and a height is between 0.25 times the wavelength and 0.5 times the wavelength.

4. The multiple polarized dish antenna according to claim 1, wherein a diameter of the main dish reflector is between 5 times a wavelength and 10 times the wavelength of the antenna frequency band, and a height of the main dish reflector on an axis passing through a center of the inner concave surface is between 1 times a wavelength and 5 times the wavelength of the antenna frequency band.

5. The multiple polarized dish antenna according to claim 1, further comprising a secondary reflector disposed beside the inner concave surface, wherein the at least one radiator faces the secondary reflector, and the radiation energy emitted by the multiple polarized antenna source is reflected by the secondary reflector to the inner concave surface, and is reflected by the inner concave surface.

6. The multiple polarized dish antenna according to claim 5, wherein the main dish reflector comprises an axis passing through a center of the inner concave surface, the multiple polarized antenna source is located at the center of the inner concave surface, and the secondary reflector is located on the axis.

7. The multiple polarized dish antenna according to claim 6, wherein the secondary reflector comprises a reflective convex surface, and the reflective convex surface faces the inner concave surface and the multiple polarized antenna source.

8. The multiple polarized dish antenna according to claim 6, wherein the secondary reflector comprises a reflective concave surface, and the reflective concave surface faces the inner concave surface and the multiple polarized antenna source.

9. The multiple polarized dish antenna according to claim 5, wherein and a farthest distance between the secondary reflector and a center of the inner concave surface of the main dish reflector is a square of a diameter of the main dish reflector/(16*a height of the main dish reflector on an axis passing through the center).

10. The multiple polarized dish antenna according to claim 6, wherein a height of the hollow waveguide member protruding from the inner concave surface is greater than a height of the at least one radiator protruding from the inner concave surface.

11. The multiple polarized dish antenna according to claim 1, wherein the multiple polarized antenna source is located on a focal point of the inner concave surface, and the at least one radiator faces the inner concave surface.

12. The multiple polarized dish antenna according to claim 11, wherein the main dish reflector comprises an axis passing through a center of the inner concave surface, the multiple polarized antenna source is located on the axis.

* * * * *